US006482510B1

(12) United States Patent
Rajan et al.

(10) Patent No.: US 6,482,510 B1
(45) Date of Patent: Nov. 19, 2002

(54) DIGITAL PRINTABLE AND RELEASABLE FORM CONSTRUCTION AND COMPOSITION USEFUL THERETO

(75) Inventors: J. Sundar Rajan, Woodbury, MN (US); Roberta E. Harelstad, Woodbury, MN (US); Joey L. Reule, Cottage Grove, MN (US); Ramesh C. Kumar, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 197 days.

(21) Appl. No.: 09/635,608

(22) Filed: Aug. 10, 2000

Related U.S. Application Data

(63) Continuation-in-part of application No. 09/379,534, filed on Aug. 24, 1999, now Pat. No. 6,406,787, which is a continuation-in-part of application No. PCT/US99/06918, filed on Mar. 30, 1999.

(51) Int. Cl.[7] ............................. B32B 7/04; B32B 7/10

(52) U.S. Cl. ................... 428/349; 428/343; 428/425.5; 428/446; 428/447; 525/418; 525/451

(58) Field of Search .......................... 428/349, 425.5, 428/446, 447, 343; 525/418, 451

(56) References Cited

U.S. PATENT DOCUMENTS

| 2,407,680 A | 9/1946 | Palmquist et al. ............. 88/82 |
| RE24,906 E | 12/1960 | Ulrich ......................... 206/59 |
| 3,011,988 A | 12/1961 | Luedke et al. ............. 260/29.6 |
| 3,190,178 A | 6/1965 | McKenzie ...................... 88/82 |
| 3,684,348 A | 8/1972 | Rowland ..................... 350/103 |
| 4,025,159 A | 5/1977 | McGrath ..................... 350/105 |
| 4,279,717 A | 7/1981 | Eckberg et al. ........ 204/159.13 |
| 4,563,539 A | 1/1986 | Gornowicz et al. ......... 556/421 |
| 4,801,193 A | 1/1989 | Martin ....................... 350/103 |
| 4,895,428 A | 1/1990 | Nelson et al. ............... 350/103 |
| 4,896,943 A | 1/1990 | Tolliver et al. ............. 350/105 |
| 4,938,563 A | 7/1990 | Nelson et al. ............... 350/103 |
| 5,032,460 A | 7/1991 | Kantner et al. ............. 428/449 |
| 5,045,426 A | 9/1991 | Maierson et al. ........... 430/126 |
| 5,064,272 A | 11/1991 | Bailey et al. ............... 359/541 |
| 5,066,098 A | 11/1991 | Kult et al. .................. 359/540 |
| 5,089,336 A | 2/1992 | Kumar et al. ............... 428/352 |
| 5,104,719 A | 4/1992 | Kamen et al. .............. 428/195 |
| 5,143,466 A | 9/1992 | Baldwin et al. ............. 402/79 |
| 5,154,962 A | 10/1992 | Mertens et al. .............. 428/40 |
| 5,219,641 A | 6/1993 | Mehta et al. ............... 428/211 |
| 5,378,575 A | 1/1995 | Rajan et al. ................ 430/126 |
| 5,462,468 A | 10/1995 | Adkins et al. .............. 427/265 |
| 5,496,635 A | 3/1996 | Francis et al. .............. 428/352 |

(List continued on next page.)

FOREIGN PATENT DOCUMENTS

| EP | 0 529 691 A1 | 3/1993 |
| EP | 0 779 162 | 3/2000 |
| WO | WO 96/03285 | 2/1996 |
| WO | WO 96/24867 | 8/1996 |
| WO | WO 99/11683 | 3/1999 |
| WO | WO 00/58930 | 10/2000 |

OTHER PUBLICATIONS

"Directly printable pressure sensitive adhesive tape—may be unwound, printed in one–step process directly on release surface and wound up immediately", WPI World Patent Information, Derwent, vol. 1, No. 95, 1994.

(List continued on next page.)

*Primary Examiner*—Duc Truong
(74) *Attorney, Agent, or Firm*—Carolyn A. Fischer

(57) ABSTRACT

A novel form construction comprising a substrate (e,g., a form sheet or roll goods) having a digital printable surface portion and a release surface portion, on which release coating surface portion a signage with a pressure-sensitive adhesive can be releasably adhered. A digital printable release coating composition is also provided.

23 Claims, 3 Drawing Sheets

U.S. PATENT DOCUMENTS

| | | | |
|---|---|---|---|
| 5,508,105 A | 4/1996 | Orensteen et al. | 428/323 |
| 5,516,865 A | 5/1996 | Urquiola | 526/329.7 |
| 5,545,459 A | 8/1996 | Chang | 428/121 |
| 5,576,356 A | 11/1996 | Leir et al. | 522/31 |
| 5,601,682 A | 2/1997 | Longtin | 156/272.2 |
| 5,634,670 A | 6/1997 | Orensteen et al. | 283/81 |
| 5,672,381 A | 9/1997 | Rajan | 427/198 |
| 5,698,296 A | 12/1997 | Dotson et al. | 428/195 |
| 5,725,935 A | 3/1998 | Rajan | 428/195 |
| 5,744,207 A | 4/1998 | Bartusiak et al. | 428/41.8 |

OTHER PUBLICATIONS

PCT International Search Report dated Feb. 5, 2000.

*Scotchal™ Screen Printing Ink Series 9700 UV*, Product Bulletin 9700, Minnesota Mining and Manufacturing Company, pp. 1–7, (Mar., 1998).

*Principles of Non Impact Printing*, J.L. Johnson, Palatino Press (1986).

*Understanding Digital Color*, Phil Green, Graphic Arts Technical Foundation (1995), pp 293–310.

*Pocket Pal, A Graphic Arts Production Handbook*, edited by M. Bruno, International Paper Co., $16^{th}$ Ed. (1995) pp 126–150.

ASTM D 1878–61T (1957).

ASTM D3330–78 PSTC–1 (11/75).

*Handbook of Adhesives*, $3^{rd}$ Ed. P 656 (1990).

DIGITAL PRINTABLE AND RELEASABLE FORM CONSTRUCTION AND COMPOSITION USEFUL THERETO

This is a continuation-in-part of U.S. patent application Ser. No. 09/379,534, filed Aug. 24, 1999 now U.S. Pat. No. 6,406,787, which is herein U.S. patent application Ser. No. 09/379,534 is a continuation in part of PCT/US99/06918 filed Mar. 3, 1999 incorporated by reference.

FIELD

The present invention relates to new form constructions and digital printable releasing coating compositions useful thereto.

BACKGROUND

Validation stickers are used as proof of registration of automobiles and other articles (e.g., trucks, snowmobiles, etc.) These retroreflective stickers generally have a printable plastic top surface and a pressure sensitive adhesive (PSA) on the bottom with a protective liner that is removed before it is adhered to the ultimate surface such as an automobile license plate. These stickers usually have variable information that is printed using screen printing, letter press, offset, laser or thermal transfer printing technologies. The end user (e.g., automobile owner) typically also gets a card with his/her address, insurance information, amount paid, etc., at the time the fees are paid to the issuing agency, typically a Department of Motor Vehicles Agency of the State Government. More and more these agencies like to process these stickers and cards at the same time and on demand as needed. So stickers with the liners are pre-attached to cards via an additional layer of adhesive between the liner and the card surface prior to the printing operation. There are some problems, however, with this approach, and they include: (1) an extra layer of an adhesive is needed which adds to cost of sticker; (2) a sticker with a liner on paper makes the area containing the sticker much thicker than the rest of the paper creating media jamming problems in a printer; and (3) because of the added thickness of a sticker, it gets picked off at idlers in a printer or when it goes through a fusing area in a laser printer. In terms of the paper surface, it has to be print-receptive for different types of marking materials. For example thermal transfer printing requires a special coating be put on the paper surface before the sticker is placed on it so that the paper surface can be printed on.

Thus, there is a need for a form construction with a signage such as a sticker in which an additional liner with an additional adhesive is eliminated so that it is economical and the form with the signage can be printed in a digital printer (such as a laser printer or an ink-jet printer) and the problems as above are removed.

SUMMARY

In accordance with a first aspect of the present invention, there is provided a novel filling-in form construction that includes a substrate having a digital printable surface portion and a release coating surface portion, on which release coating surface portion a signage with a pressure sensitive adhesive can be releasably adhered.

In accordance with a second aspect of the present invention, there is provided a filling-in form construction that includes a substrate having a digital printable surface portion and a release coating surface portion, and a signage article having a pressure sensitive adhesive on one surface thereof and adhered to the release coating surface portion of the substrate by the adhesive. Preferably, the signage article comprises a retroreflective sheeting and may be a part of a validation sticker.

In accordance with a third aspect of the present invention, there is also provided a digital printable release coating composition comprising a copolymerization product (I) of (a) 25 to 70% by weight of at least one ester of acrylic acid or methacrylic acid with a long chain alkyl terminated primary alcohol, wherein the terminal alkyl chain is from 12 to 22 carbon atoms in length; (b) 4 to 15% by weight of at least one carboxylic acid functional monomer; and (c) 15 to 60% by weight of at least one free radically polymerizable monomer.

The digital printable release coating composition may preferably be a blend of the copolymerization product (I) and at least one silicone/acrylate copolymer (II) in a ratio of the blend of (I)/(II) in a range of not more than 90/10, preferably between 90/10 to 60/40, more preferably between 85/15 to 65/35, most preferably between 80/20 to 70/30.

A preferable silicone/acrylate copolymer (II) is as described in U.S. Pat. No. 5,032,460, which is herein incorporated by reference. A preferred copolymer has the formula:

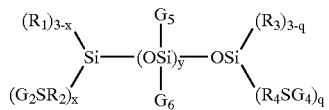

wherein

R$_1$ are monovalent moieties which can independently be the same or different which are selected from the group consisting of alkyl, aryl, alkylaryl, alkoxy, alkylamino, hydroxyl, fluoroalkyl, and hydrogen;

R$_2$ and R$_4$ are divalent linking groups which can independently be the same or different and include, but are not limited to, C$_1$ to C$_{10}$ alkylene, arylene, alkylarylene and alkoxyalkylene;

R$_3$ are monovalent moieties which can independently be the same or different which are selected from the group consisting of alkyl, aryl, alkaryl, alkoxy, alkylamino, hydroxyl and fluoroalkyl, and hydrogen;

x is an integer of 0–3;

y is an integer of preferably 10 or greater;

q is an integer of 0–3; and

G$_5$ and G$_6$ are monovalent moieties which can independently be the same or different selected from the group consisting of alkyl, aryl, alkylaryl, alkoxy, alkylamino, fluoralkyl, hydrogen, and —WSA;

W is a divalent linking group;

A is a polymeric segment or block consisting essentially of polymerized free radically polymerizable monomer; and G$_2$ and G$_4$ are the same or different and comprise A.

Another preferable silicone/acrylate copolymer (II) is described in U.S. Pat. No. 5,154,962, which is herein incorporated by reference. One preferred copolymer is a copolymer of D and E monomers copolymerized to form a polymeric backbone with F monomer grafted thereto, wherein D is at least one free radically polymerizable monomer;

E is at least one polar monomer copolymerizable with D, the amount of E being up to 30% of the total weight of all monomers, and F is a monomer having the general formula:

wherein
- X is a group copolymerizable with the D and E monomers,
- Y is a divalent linking group where n is zero or 1;
- m is an integer of from 1 to 3;
- R is suitably hydrogen, lower alkyl (e.g., methyl, ethyl, or propyl), aryl (e.g., phenyl or substituted phenyl), or alkoxy; and
- Z is a monovalent siloxane polymeric moiety having a number average molecular weight above about 1,000 and is essentially unreactive under copolymerization conditions.

The digital printable release coating composition may alternatively be a blend of the copolymerization product (I) and at least one silicone containing release agent (III), preferably a premium release polydimethyl siloxane, in a ratio of the blend of (I)/(III) in a range of not more than 90/10, preferably between 90/10 to 50/50, more preferably between 60/40 to 50/50.

Suitable silicone release agents include conventional silicone containing release coatings used in the pressure sensitive adhesive art. Suitable agents are described, for example, in U.S. Pat. No. 5,576,356, which is herein incorporated by reference. Typically preferred such agents include polymeric silicone containing coatings that by themselves provide a release surface for typical pressure sensitive adhesives.

One suitable silicone release agent is made by processing polydimethyl silanol solution (e.g., SS-4191 A, available from GE Silicone), tin catalyst solution (SS-4192 C, available from GE Silicone), dimethyl amino propyl silane (e.g., SS-4259 C, available from GE Silicone) and calcofluor white fluoroescent dye (e.g., Blankophor 5% available from Bayer). The resulting mixture suitably may be adjusted to approximately 5% solids in toluene before coating on a substrate. The digital printable release coating composition may alternatively be a blend of the silicone/acrylate copolymer (II) and at least one silicone containing release agent (III), preferably a premium release polydimethyl siloxane, in a ratio of the blend of (II)/(III) in a range of not more than 90/10, preferably between 90/10 to 70/30, more preferably between 80/20 to 75/25. In a further aspect of the present invention, there is provided a filling-in form construction that includes a substrate having a digital printable release coating surface portion and a signage article having a pressure sensitive adhesive on one surface thereof and adhered to the release coating surface portion of the substrate by the adhesive, wherein the digital printable release coating surface portion has a coating comprising the chemical composition of the third aspect of the present invention.

DETAILED DESCRIPTION OF THE PREFERREED EMBODIMENTS

New Form Construction

Figure 1:
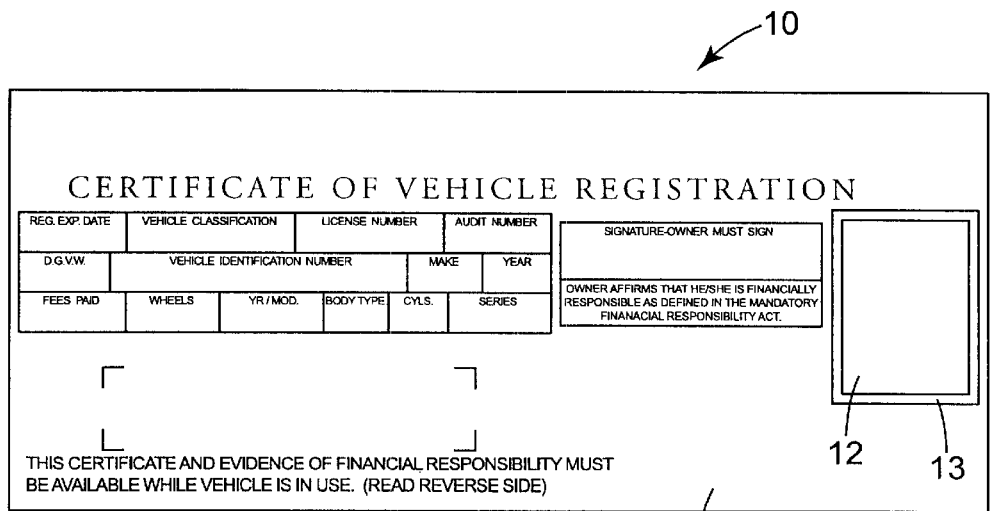
FIGS. 1 to 3 show examples of a form construction according to the present invention.

The type of the filling-in form construction to which the present invention can be applied is not particularly limited and it is sufficient if a form has an advantage when it is printable together with a signage applied thereon and the signage is releasable. Examples of such a signage include validation stickers, indoor/outdoor labeling products, product authentication articles, inventory labeling and control articles, window stickers and inspection stickers for automobiles and other equipment, parking permits, expiration stickers, etc.

The substrate of the form construction is not limited and suitably may be of paper or a plastic or other material. Paper is a preferable substrate. The substrate may be in the form of individual sheets. Alternatively, the substrate may be in the form of a roll. Such roll preferably includes individual portions separated by perforation lines. These portions can be separated into individual sheets. In the following discussion of specific embodiments, the form construction is described as including a substrate in the form of a form sheet, although other forms of the substrate are envisioned as well. If a roll form of any of the specific embodiments is desired, one of skill in the art could modify the construction accordingly without undue experimentation.

In one preferred example, a signage comprises a retroreflective sheeting.

The substrate of the form construction (e.g., a form sheet) in accordance with the first and second aspects of the present invention has a printable filling-in surface portion and a release coating surface portion. The printable filling-in surface portion and release coating surface portion may be separate areas from each other, or may overlap with each other. In a most simple case, the release coating surface portion is provided only where a signage should be applied and no release coating is provided onto the other surface portion of the form sheet. This construction is simple and cheap. In a preferable embodiment, the whole surface of one side of the form sheet is rendered printable and releasable by providing a printable release coating thereto.

In the form construction of the present invention, the form sheet may have been documented or non-documented (printed or unprinted) before a signage is applied thereto. The documentation may be made any time on or before printing is made on a form sheet attached with a signage. However, it is typical that a filling-in form sheet is documented before using the form sheet by filling-in the form. The documentation may be made on the surface of the substrate (e.g., sheet, such as paper) before the release coating is provided to the substrate sheet, and/or it may be made on the release coating if the release coating is printable. The portion to be printable must include at least the filling-in surface portion but, preferably, includes not only the filling-in surface portion but also the surface of the signage.

The form construction of the present invention has a release coating on at least a portion of the surface of a form sheet, by which the releasable surface portion is formed. The release coating is provided to the form sheet at least where a signage is to be applied. It is a preferred embodiment that a digital printable release coating is provided on the surface of the form sheet. In this case, the release coating may be provided on the entire surface of one side of the form sheet including the filling-in surface portion and a signage may be applied anywhere so that handling of a form sheet with a signage is easy. In accordance with the present invention, not only a new form construction but also a useful digital printable release coating composition is provided.

The release coating surface is not particularly limited but it is preferred that the release coating is heat and humidity stable since certain printing operations (such as laser printing and thermal transfer printing) involve a heat treatment process. If the releasable surface is not heat and humidity stable, an adhesive of a signage in contact with the release coating may be deteriorated after the heat-involving printing process or by humidity, which may undesirably prevent the signage from being used in applications where a strong adhesion of a signage is required, for example, as automotive validation stickers. This is particularly true in the cases where a silicone release coating is used, since a silicone coating usually includes a certain amount of an unreacted free silicone ingredient, which may migrate into an adhesive in a heat treatment process or with humidity and cause an adhesion loss. It is therefore preferred that such migration be prevented or minimized and the release coating be substantially heat and humidity stable.

Suitable signage used in the present invention has a pressure sensitive adhesive layer on a surface thereof and is applied onto the release coating surface portion of the form sheet. The opposite surface of the signage may have a marking and/or may be printable. That is, the top surface of the signage may preferably be printable but may be unprintable. If a marking has been provided to a signage before it is applied to a form sheet and the form sheet with the signage applied thereto is printable at least on the filling-in surface portion, it is sufficient in the present invention. However, it is preferred that the signage is also printable and a marking obtained by the printing is well anchored or durable, since in this case, the preliminary printing of the signage may be eliminated and/or new and/or additional information can be provided to the signage by printing during a process including printing to the form sheet.

After the printing on the filling-in surface portion and optionally on the signage, the signage is released from the release coating surface of the form sheet and applied to the ultimate surface. Since the form construction of the present invention does not need a liner with an additional adhesive between the signage and the form sheet, it has an economical advantage and it is less likely to jam in a printer.

Figure 2:
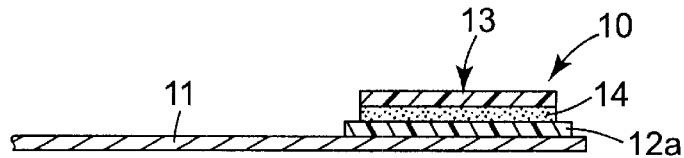
Figure 3:
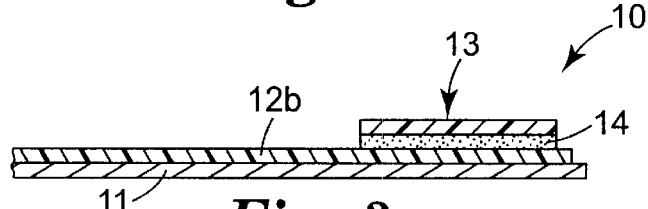

FIGS. 1 to 3 show examples of a form construction according to the present invention. FIG. 1 is an example of a certificate of vehicle registration, generally denoted as 10, in a portion of which a validation sticker 12 is applied to. FIGS. 2 and 3 are cross-sectional views of the certificate 10 in FIG. 1. In FIGS. 2 and 3, on a paper form 11 is a release coating 12*a* or 12*b*, onto which a validation sticker or label 13 having an adhesive 14 is applied. The sticker 13 may be retroreflective. The sticker 13 may have a mark or print on it and may be printable. The release coating 12*a* is formed only in a part of the surface of the paper 11 in FIG. 2 and the release coating 12*b* is formed in the whole area of the paper in FIG. 3. Most preferably, the release coating 12*b*, when formed on the whole area of the certificate, should be printable.

Figure 4A:
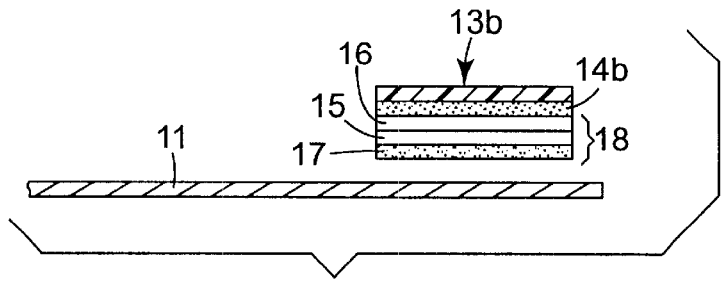
FIGS. 4A and 4B show an example of a sticker to be applied onto a form such as a certificate of vehicle registration in the prior art.
Figure 4B:
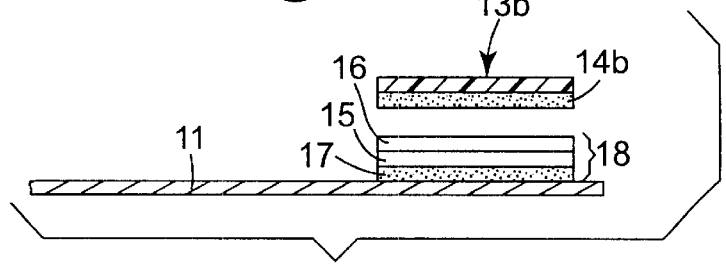

FIGS. 4A and 4B show an example of a sticker to be applied onto a form sheet such has a certificate of vehicle registration in the prior art. A sticker or label 13*b* has a first adhesive 14*b* and a liner 18 which comprises a liner substrates, a release coating 16 and a second adhesive 17. This sticker 13*b* is applied to a form sheet such as a certificate 11 by the second adhesive 17. When the sticker 13*b* is to be used for the ultimate surface, the sticker 13*b* with the first adhesive 14*b* are released from the release coating 16 of the liner 18, as shown in FIG. 4B. Thus, the sticker in the prior art has a liner comprised of a liner 18 substrate 15 and a release coating 16, and an additional adhesive 17.

Digital Printable Surface

The term "digital printable" means printable by a digital printing including, not limited thereto, laser, ink-jet, thermal mass transfer, thermal dye transfer, electrostatic, ion deposition, electron beam imaging, solid ink-jet and dot-matrix printings. It is preferable that the digital printable surface is laser or ink-jet printable.

The digital printable surface may be an area of a form sheet other than an area of the release coating surface, if the release coating surface is not digital printable. Preferably, the entire area of the form sheet is a printable and release coating surface by using a digital printable release coating.

The following is a brief description of some of the printing processes that can be used in the methods of the present invention. More detailed information is available in standard printing text books. Examples of such books include Principles of Non Impact Printing, by J. L. Johnson, Palantino Press (1986); *Understanding Digital Color*, by Phil Green, Graphic Arts Technical Foundation (1995), pp 293–310; and *Pocket Pal, A Graphic Arts Production Handbook*, edited by M. Bruno, International Paper Co., 16$^{th}$ edition (1995), pp. 126–150.

Electrostatic printing consists of an imaging step that involves direct deposition of electrostatic charge onto a surface that has been prepared to be printed followed by the toning step using liquid toners. This is followed by a step that involves fusing the toners with heat and/or pressure. Printers using this technology are available in wide widths up to 52 inches and are used for printing architectural drawings, billboards, etc. Electrophotographic printing (including laser printing and xerography) is similar to high speed copier systems. An electrophotographic system includes, for example, an electrostatic photoconductor that is charged by a corona discharge lasers modulated by digital signals from a digital imaging system (e.g., a PostScript-based digital imaging system), and a system for transferring a toned image from the photoconductor to a substrate. Systems are in use for printing variable information in single or spot color specialty printing of products at speeds up to 300 feet/minute. Slower systems for 4-color variable and on-demand printing are being used for the short-run color printing market Ion deposition printing, also referred to as electron beam imaging (EBI), consists of four simple steps: (1) a charged image is generated by directing an array of charged particles (electrons) from an imaging cartridge toward a heated rotating drum which consists of very hard anodized aluminum, (2) a single component magnetic toner is attracted to the image on the drum as it rotates, (3) the toned image is transfixed to the receiving surface with pressure, and (4) residual toner is scraped from the drum. It is then ready for reimaging. A new system using new materials is capable of producing high quality continuous-tone four color process images.

Magnetographics is similar to EBI printing except that a magnetic drum is used, and a magnetic charge is produced on the drum by a computer-generated variable image and a monocomponent magnetic toner. Its main advantage is ease of imaging with digital data.

Ink-jet printing is used mainly for variable printing information such as addresses and codes on computer letters, sweepstake forms, and other personalized direct mail advertising. There are a number of types of inkjet printers: continuous drop, drop-on-demand, bubble-jet, single-jet, and multiple-jet. Images are produced digitally with water soluble dyes. Inkjet printers generate ink droplets, either by forcing a stream through a nozzle or by propelling droplets on demand depending on the image being printed. Drop-on-demand inkjet printers propel ink by thermal (ink vaporization) or piezoelectric methods (phase change).

Thermal mass transfer printing uses computer-generated digital text and graphics data to drive a thermal printhead that melts spots of ink on doner ribbons and transfers them to a receiver. Systems in use have built-in computers and produce finished labels and other printed products with over 25% variable information in 4 colors laminated and either rotary or flat die-cut.

Tacky Pressure Sensitive Adhesives

Suitable tacky pressure sensitive adhesives (PSAs) for use in signage of the present invention are typically and preferably aggressively and permanently tacky at room temperature, adhere to substrates without the need for more than hand pressure, and require no activation by water, solvent or heat. Suitable PSAs are disclosed, for example, in U.S. Pat. No. 5,725,935 (Signage Articles Methods of Making the Same), which is herein incorporated by reference.

Tacky PSAs suitable in the present invention are preferably selected from the group consisting of alkylacrylate polymers and copolymers; copolymers of alkylacrylates with acrylic acid; terpolymers of alkylacrylates, acrylic acid, and vinyl-lactates; alkyl vinyl ether polymers and copolymers; polyisoalkylenes; polyalkyldienes; alkyldiene-styrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof. Examples include polyisobutylenes, polybutadienes, or butadiene-styrene copolymers, and mixtures thereof (such polymers and copolymers preferably have no reactive moieties, i.e., are not oxidized in the presence of air); silicone-based compounds such as polydimethylsiloxane, and polymethylphenylsiloxane combined with other resins and/or oils.

Other suitable tacky PSAs also include tackified thermoplastic resins and tackified thermoplastic elastomers, wherein the tackifier comprises one or more compounds which increases the tack of the composition. An example of a tackified thermoplastic resin useful as an aggressively tacky PSA is the combination of a vinyl acetate/ethylene copolymer known under the trade designation VYNATHENE EY 902-30 (available from Quantum Chemicals, Cincinnati, Ohio) with substantially equal portions of the tackifiers known under the trade designations PICCOTEX LC (a water-white thermoplastic resin produced by copolymerization of vinyltoluene and alpha-methylstyrene monomers having a ring and ball softening point of about 87°–95° C., available from Hercules Incorporated, Wilmington, Del.) and WINGTACK 10 (a liquid aliphatic C-5 petroleum hydrocarbon resin available from Goodyear Chemical) and an organic solvent such as toluene. An example of a tackified thermoplastic elastomer useful as an aggressively tacky PSA is the combination of the styrene-poly(ethylene-butylene)-styrene block copolymer known under the trade designation KRATON G1657 (available from of Shell Chemicals) with one or more of the low molecular weight hydrocarbon resins known under the trade designation REGALREZ (from Hercules) and an organic solvent such as toluene. Both of these formulations may be coated using a knife coater and air dried, or air dried followed by oven drying. Of course, the invention is not limited to use of these specific combinations of thermoplastic resins, thermoplastic elastomers, and tackifiers.

Some presently preferred PSA's exhibit extended shelf life and resistance to detackifying under atmospheric conditions, and include acrylic-based copolymer adhesives as disclosed in U.S. Pat. No. Re 24,906. One example of such an acrylic-based copolymer is a 95.5:4.5 (measured in parts by weight of each) isooctylacrylate/acrylic acid copolymer. Another preferred adhesive is the copolymer of a 90:10 weight ratio combination of these two monomers. Yet other preferred adhesives are terpolymers of ethyl acrylate, butyl acrylate, and acrylic acid; copolymers of isooctylacrylate and acrylamide; and terpolymers of isooctylacrylate, viny-lacetate, and acrylic acid.

Tacky acrylic PSAs useful in the invention can be coated out of a coatable composition comprising an organic solvent, such as a heptane:isopropanol solvent mixture, and the solvent subsequently evaporated, leaving a pressure-sensitive adhesive coating. This layer is preferably from about 0.038 centimeters (cm) to about 0.11 cm (5 to 15 mils) thick when the substrate is a retroreflective sheeting material.

As used herein, "tack" refers to the property of a material which enables it to form a bond of measurable strength immediately on contact with another surface. (See, e.g., ASTM D1878-61T (1957). A common piece of test equipment used by ASTM is a Polyken probe tack tester, which, according to Handbook of Adhesives, 3rd Ed. p. 656(1990), comprises a 5 millimeter diameter flat-ended rod (usually steel) connected to a load cell. The instrument mechanically lifts the probe to make contact with the PSA, holds it there for a preset time of contact, variable in 10 steps from 0.1 to 100 seconds, and then withdraws the probe at a controlled speed, which can be varied in steps from 0.02 to 2 cm/sec. The PSA, on some backing, is attached to the flat bottom of an inverted metal cup with a hole in the bottom through which the probe enters. Thus, the contact pressure can be varied using by using cups or annular weights of various masses. The most common test conditions reported are 100 g/cm contact pressure, 1 second contact time, and 1 cm/sec withdrawal speed (commonly denoted using the shorthand notation "100, 1, 1").

Experimental values of Polyken probe tack are expressed in terms of gram force, with all conditions specified. In the present invention, the phrases "tacky" and "aggressively tacky" are used interchangeably and mean the PSA in question suitably has a probe tack as measured in accordance with ASTM D 1878-61 T of at least 500 g (100, 1, 1), preferably at least 1000 g; while the term "non-tacky" means the PSA in question has a tack of at most 400 g (100, 1, 1).

Tacky PSAs useful in the invention also may be characterized by having "180° peel adhesion" ranging from about 170 to about 1000 gm/cm, more preferably ranging from about 390 to about 560 gm/cm, measured using a standard test procedure. In this procedure, the force necessary to remove (i.e. peel) a PSA-coated substrate from a test substrate when the PSA-coated substrate is peeled from the test substrate is termed the "peel adhesion" value. A standard glass plate is cleaned using a solvent (such as one wash of diacetone alcohol followed by three washes of n-heptane). With very light tension, a sample having a PSA-backsize coating is then applied along the center of the standard glass plate, PSA side down. The sample is then rolled once with a 2.04 Kg hand roller. The standard glass plate is then secured to a horizontal platen in a standard peel adhesion tester such as that known under the trade name "IMASS." One end of the sample is then attached to a hook which is a part of the peel adhesion tester. The sample is peeled from the standard glass plate at a 180° angle (i.e., one end of the sample is pulled toward the other end) by moving the platen horizontally at a speed of 228.6 cm/min, and the force required recorded, in gm/cm of sample width, for various dwell times.

Release Coating Surface

The release coating surface is provided to a form sheet in order to provide an area where a signage with a pressure sensitive adhesive is releasable, by which a form sheet with a signage can be handled as a unitary body during a process including printing. In preferred embodiments, the release coating is also printable.

Any suitable release coating which allows pressure-sensitive adhesive release may be used for the purpose of the present invention. However, a preferable release coating is a heat and humidity stable one, by which substantially no adhesion loss of a signage occurs when a form sheet with a signage is placed in a humid atmosphere or it is printed. If the deterioration of the release coating by heat or humidity is not prevented or limited, an adhesion loss of the pressure-sensitive adhesive of the signage may occur and impede the signage from its use in severe conditions.

An adhesion loss is preferably less than 10%, more preferably less than 5% after a heat treatment in printing such as a fusing process of laser printing.

It is preferred that the release coating is digital printable. If the release coating is digital printable, the release coating may be provided anywhere regardless where the filling-in surface portion should be provided to the form sheet.

Preferred Release Coating Composition (I)

A release coating which provides the release coating surface portion to a form sheet is not particularly limited, as long as it provides a release surface.

A preferable example of the release coating composition which can be used to form a digital printable release coating of the present invention comprises a copolymerization product (I) of (a) 25 to 70% by weight of at least one ester of acrylic acid or methacrylic acid with a long chain alkyl terminated primary alcohol, wherein the terminal alkyl chain is from 12 to 22 carbon atoms in length; (b) 4 to 15% by weight of at least one carboxylic acid functional monomer; and (c) 15 to 60% by weight of at least one free radically polymerizable monomer.

This release coating composition (I) provides a release coating which is also digital printable. Preferred compositions melt at approximately 60 to 65 degrees C. As a result, toner can be fused into the coating during the heat cycle of one such typical digital printing operation.

While not intending to be bound by theory, it is presently believed that item "(a)" of product (I), i.e., esters of acrylic acid or methacrylic acid with a long chain alkyl terminated primary alcohol, functions to provide release properties to the surface. It is also believed that items "(b)" and "(c)" of product (I) function to make the coating adhere to the substrate and/or promote printability.

Suitable free radically polymerizable monomers may be selected from the group consisting of methyl acrylate, methyl methacrylate, isobutyl methacrylate, acrylonitrile, methacrylonitrile, ethyl acrylate, isbornyl (meth)acrylate, N-Vinyl pyrollidone, and N-Vinyl caprolactam.

Another Preferred Release Coating Composition Blend of (I) with Silicone/Acrylate Copolymer (II)

It is more preferred that the above release coating composition or copolymerized product (I) is blended with at least one silicone/acrylate copolymer (II) in a blend weight ratio (I)/(II) in a range of not more than 90/10, preferably between 90/10 to 60/40, more preferably between 85/15 to 65/35, most preferably between 80/20 to 70/30.

Copolymer (II) preferably has at least one siloxane polymeric segment and at least one hydrocarbon polymeric segment (e.g., acrylate or vinyl functional segment) and has a $T_g$ between about −10° C. and 65° C. While not being bound by theory, it is thought that the silicone segment presents a low energy, "siliconized" release surface and the higher energy hydrocarbon polymeric segment provides the adhesion for the marking material (e.g., toner particles).

One embodiment of this copolymer (II) comprises the formula:

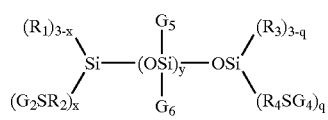

wherein $R_1$ are monovalent moieties which can independently be the same or different which are selected from the group consisting of alkyl, aryl, alkylaryl, alkoxy, alkylamino, hydroxyl, fluoroalkyl, and hydrogen. Preferably, $R_1$ are monovalent moieties which can independently be the same or different selected from the group consisting of $C_{1-4}$ alkyl methyl and butyl.

$R_2$ are divalent linking groups which can independently be the same or different. Suitable divalent linking groups include but are not limited to the following: $C_1$ to $C_{10}$ alkylene, arylene, alkylarylene and alkoxyalkylene. Preferably, $R_2$ is selected from the group consisting of $C_{1-3}$ alkylene and $C_7$–$C_{10}$ alkylarylene due to ease of synthesis of the compound. Most preferably, $R_2$ is selected from the group consisting of —$CH_2$—; 1,3-propylene; and —$CH_2$—Ph—$CH_2CH_2$—.

$R_3$ are monovalent moieties which can independently be the same or different which are selected from the group consisting of alkyl, aryl, alkaryl, alkoxy, alkylamino, hydroxyl and fluoroalkyl, and hydrogen. Preferably, $R_3$ are monovalent moieties which can independently be the same or different selected from the group consisting of $C_{1-4}$ alkyl and hydroxyl. Most preferably, $R_3$ is selected from the group consisting of methyl and butyl.

$R_4$ are divalent linking groups which can independently be the same or different. Suitable divalent linking groups include but are not limited to the following: $C_1$ to $C_{10}$ alkylene, arylene, alkylarylene and alkoxyalkylene. Preferably, $R_4$ is selected from the group consisting of $C_{1-3}$ alkylene and $C_7$-$C_{10}$ alkylarylene for reasons of ease of synthesis. Most preferably, $R_4$ is selected from the group consisting of —$CH_2$—; 1,3-propylene; and —$CH_2$—Ph—$CH_2CH_2$—.

x is an integer of 0 to 3;

y is an integer of preferably 10 or greater;

q is an integer of 0 to 3; and $G_5$ and $G_6$ are monovalent moieties which can independently be the same or different selected from the group consisting of alkyl, aryl, alkylaryl, alkoxy, alkylamino, fluoralkyl, hydrogen, and —WSA wherein W is a divalent linking group and A is defined below.

W are divalent linking groups. Suitable divalent linking groups include, but are not limited to, $C_1$ to $C_{10}$ alkylene, alkarylene, arylene, and alkoxyalkylene.

Preferably, W is selected from the group consisting of methylene and propylene.

$G_2$ and $G_4$ are the same or different and comprise A.

A is a polymeric segment or block consisting essentially of polymerized free radically polymerizable monomer. A can comprise either a homopolymer segment or block or a copolymer segment or block. While not intending to be bound by theory, it is presently believed that the printed matter anchorage properties of the coating are determined in part by the hydrocarbon polymeric segment content and that the chemical nature or composition of the hydrocarbon polymeric segments can be modified independent of the release aspect to improve marking material (e.g., toner) anchorage and adhesion to the substrate. A can include, but is not limited to, those monomers wherein the free radically polymerizable monomer or monomers are chosen such that a segment has a $T_g$ or $T_m$ above about $-20°$ C. The preferred free radically polymerizable monomers are selected from the group consisting of styrene, methyl methacrylate, methyl acrylate, acrylic acid, methacrylic acid, acrylonitrile, isobornyl acrylate, isobornyl methacrylate, N-vinyl pyrrolidone, butyl methacrylate, isopropyl methacrylate, vinyl acetate, hydroxy propylacrylate, hydroxy ethyl acrylate and mixtures thereof.

The amount and composition of the ethylenically unsaturated (e.g., vinylic) segment to silicone (E/S) should range between about 98/2 to 40/60 parts by weight. It is preferred that the hydrocarbon polymeric segments should have a molecular weight in the range of 2,000 to 80,000, more preferably 5,000 to 50,000.

The release properties of the coating containing the copolymer (II) are typically determined by both the silicone content (weight percentage) present in the copolymer (II) and the molecular weight of the silicone segment, with higher silicone content and/or molecular weight typically providing easier release. The copolymer and copolymer blend can, therefore, be chemically tailored to provide a specific level of release which can be reproduced with consistency, thus making possible the variation of the release properties of a coating over a range of values in a controlled fashion.

The silicone polymeric segment of the copolymer (II) generally must have an average molecular weight above about 1,000 in order for the release coating to function properly. Preferably, the silicone polymeric segment has a number average molecular weight of about 1,000 to about 20,000. Most preferably, the silicone polymeric segment has a number average molecular weight ranging from about 2,000 to about 15,000. The silicone polymeric segment can comprise about 2 to 60 wt % of the copolymer (II) in order to allow for a wide range of release performance.

Suitable mercaptofunctional silicones are represented by a general formula:
wherein

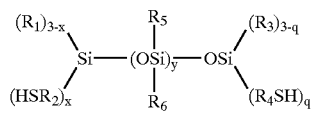

$R_1$ are monovalent moieties which can independently be the same or different and are selected from the group consisting of alkyl, aryl, alkaryl, alkoxy, alkylamino, hydroxyl, hydrogen, and fluoroalkyl;

$R_2$ and $R_4$ can independently be the same or different and are divalent linking groups;

$R_3$ are monovalent moieties which can independently be the same or different and are selected from the group consisting of alkyl, aryl, alkaryl, alkoxy, alkylamino, hydroxyl, hydrogen, and fluoroalkyl;

$R_5$ and $R_6$ are monovalent moieties which can independently be the same or different and are selected from the group consisting of alkyl, aryl, alkaryl, alkoxy, alkylamino, hydroxyl, fluoroalkyl, hydrogen and —WSH, wherein W is a divalent linking group;

x is an integer of 0 to 3;

y is an integer of preferably 10 or greater;

q is an integer of 0 to 3;

$R_5$ comprises 0 to y —WSH moieties;

$R_6$ comprises 0 to y —WSH moieties; wherein at least one of the following is true;

q is an integer of at least 1;

x is an integer of at least 1;

$R_5$ comprises at least one —WSH moiety; and $R_6$ comprises at least one —WSH moiety.

Another embodiment of the copolymer (II) comprises a copolymer of D and E monomers copolymerized to form a polymeric backbone. Grafted to the backbone is an F monomer.

The D monomer or monomers (there may be more than one) are preferably chosen such that the backbone $T_g$ or $T_m$ is above about $-20°$ C. Representative examples of D monomers include styrene, vinyl acetate, vinyl chloride, vinylidene chloride, acrylonitrile and acrylic or methacrylic acid esters of nontertiary alcohols or tertiary alcohols such as methanol, ethanol, propanol, isopropanol, butanol, isobutanol, cyclohexanol, benzyl alcohol, dodecanol, hexadecanol, and octadecanol, the alcohols having from 1 to 18 carbon atoms. Especially preferred D monomers include methyl methacrylate, butyl methacrylate, vinyl acetate, partially hydrolyzed vinyl acetate, methyl acrylate and octadecyl acrylate.

Representative E monomers useful in practicing the invention, and which may be used either individually or in combination, include carboxylic acids such as acrylic acid, methacrylic acid, itaconic acid, maleic acid, fumaric acid, and 2-carboxyethyl acrylate and their ammonium or metal salts; sulfonic or phosphonic acids such as 2-sulfoethyl methacrylate, 3-sulfopropyl acrylate, 3-sulfopropyl methacrylate, styrene sulfonic acid, and vinyl benzyl phosphonic acid and their ammonium or metal salts; amides such as acrylamide, methacrylamide, N,N-dimethyl acrylamide, and N-vinyl pyrrolidone; and monomers having hydroxyl functionality (e.g., 2-hydroxyethyl acrylate, 2-hydroxyethyl methacrylate, hydroxypropyl acrylate, and dihydroxypropyl acrylate), ammonium functionality derived from reaction of amine-containing monomers (e.g., N,N,-dimethylaminoethyl methacrylate and vinyl pyridine) with alkylating agents or protic acids, or zwitterionic functionality such as that derived by reaction of amine monomers with hydrogen peroxide or propane sulfone.

The F monomer has the general formula:

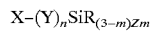

wherein,

X is a group copolymerizable with the D and E monomers.

Y is a divalent linking group where n is zero or 1;

m is an integer of from 1 to 3;

R comprises hydrogen, lower alkyl groups such as methyl, ethyl, or propyl, aryl groups such as phenyl or substituted phenyl and alkoxy groups such as methoxy and ethoxy groups; and Z is a monovalent siloxane polymeric moiety having a number average molecular weight above about 1,000 and is essentially unreactive under copolymerization conditions.

The preferred F monomer may be further defined as having an X group which has the general formula

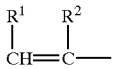

wherein $R^1$ is a hydrogen atom or a —COOH group; and $R^2$ is a hydrogen atom, a methyl group, or a —$CH_2COOH$ group.

The Z group of the F monomer preferably has the general formula

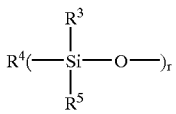

wherein $R^3$ and $R^5$ are independently lower alkyl, aryl, or fluoroalkyl, where lower alkyl and fluoroalkyl both refer to alkyl groups having from one to three carbon atoms and where aryl refers to phenyl or substituted phenyl;

$R^4$ may be alkyl, alkoxy, alkylamino, aryl, hydroxyl, or fluoroalkyl; and r is an integer from about 5 to about 700.

The copolymer (II) may comprise a blend of the copolymers of the above two embodiments.

By combining the copolymers (I) and (II), the release value is often improved since the silicone component has a low surface value. The copolymer (II) itself is a printable release coating material. However, the copolymer (II) may have a problem of an adhesion loss, probably due to presence of unreacted free silicone component, which may migrate into an adhesive under heat and/or in high humidity. While not being bound by theory, when the copolymers (I) and (II) are combined, it is believed that the free silicone component can be entangled by the long side chain of the copolymer (I), by which migration of the free silicone component into an adhesive can be prevented or minimized. Thus, an improved release coating which is heat and humidity stable and which is digital printable is obtained.

The ratio of the copolymers (I)/(II) is in a range of between 90/10 to 60/40, more preferably between 85/15 to 65/35, and most preferably between 80/20 to 70/30.

Another Preferred Release Coating Composition Blend of (I) with Silicone Containing Agent (III)

It is also preferred to blend product (I) with a silicone containing agent (III), preferably a premium release polysiloxane, in a ratio of the blend of (I)/(III) in a range of not more than 90/10, preferably between 90/10 to 50/50, more preferably between 60/40 to 50/50.

Suitable silicone release agents (III) include conventional silicone containing release coatings used in the pressure sensitive adhesive art. Thin coatings of silicone polymers on substrates such as film or paper have come to form an integral component in the construction of numerous products in the pressure sensitive adhesives industry, especially in the manufacture of labels, where such coated sheets are usually referred to as release liners. Silicone materials have been found to be especially well suited for this purpose due to the low tendency for pressure sensitive adhesives to adhere to surfaces coated with polydimethylsiloxane.

Suitable agents (III) are described, for example, in U.S. Pat. No. 5,576,356, which is herein incorporated by reference. Typically preferred such agents include polymeric silicone containing coatings that by themselves provide a release surface for typical pressure sensitive adhesives.

A number of advanced materials have been developed which are preferred for use as agent (III). These include polydimethylsiloxane materials that are substituted with small amounts of various reactive functional groups for chemically crosslinking the silicone on the substrate after coating. In some cases these coatings require some period of heating in an oven to effect the cure before the pressure sensitive adhesive can be applied. A number of reactive silicones, however, undergo a rapid cure effected by exposure to a sufficient dose of radiation, commonly emitted from ultraviolet lights, or visible lights, electron beam (E-beam) devices or thermal devices. For example, polydimethylsiloxanes substituted with small amounts of pendant acrylate groups, when combined with photoactive initiators and coated as liquid films on most substrates, upon brief exposure to radiation in an atmosphere which contains little or no oxygen crosslinks to provide solid, tack-free, premium release coatings through the free radical polymerization of the acrylic side chains, as described in U.S. Pat. No. 4,563,539 (Gornowicz et al.). Another example is that of epoxy functional silicones as described in U.S. Pat. No. 4,279,717 (Eckberg), which are commercially available from the General Electric Company.

In these types of silicone release coatings, the final cured films have a structure which is essentially silicone throughout the bulk of the coating. Because of this low concentration of non-silicone components, pressure-sensitive adhesives which contact these coatings release very easily, even when aged for extended periods of time at high temperatures.

By combining components (I) and (III), a printable release coating can be achieved. Release agent (III) itself generally does not provide a printable coating. However, the combination with copolymer (I) achieves that function. Thus, an improved release coating which is heat and humidity stable and which is digital printable is obtained.

The ratio of the copolymers (I)/(III) is in a range of between 90/10 to 60/40, more preferably between 85/15 to 65/35, and most preferably between 80/20 to 70/30.

Another Preferred Release Coating Composition Blend of (II) with Silicone Containing Agent (III)

It is also preferred to blend product (II) with a silicone containing agent (III), preferably a premium release polysiloxane, in a ratio of the blend of (I)/(III) in a range of not more than 90/10, preferably between 90/10 to 70/30, more preferably between 80/20 to 75/25. By combining components (II) and (III), a printable release coating can be achieved. Release agent (III) itself generally does not provide a printable coating. However, the combination with product (II) achieves that function. Thus, an improved release coating which is heat and humidity stable and which is digital printable is obtained.

Suitable coating compositions comprise copolymer (I); or a copolymer blend of copolymers (I) and (II); or (I) and (III);

or (II) and (III); or (I), (II) and (III); and may further contain other compatible homopolymers and/or copolymers. The low percentage of silicone contained in the copolymers makes the copolymers readily compatible with polymers of similar composition to the hydrocarbon polymeric blocks or segments.

In addition, additives, fillers or pigments such as alumina, silica, titanate, or calcium carbonate may, of course, be added to the release coating compositions.

The release coating composition preferably provides sufficient anchorage to anchor at least 50% of the marking material (e.g., toner). More preferably, it anchors at least 70% of the printed matter.

In addition, the release coating composition preferably has a surface release value not greater than about 11 N/dm. It should be understood that this upper limit applies to use with highly aggressive pressure-sensitive adhesives (PSAs) which have peel adhesion values of 45N/dm or higher. PSAs as a group fall into three broad categories (1) low (5–20N/dm), (2) intermediate (21–50N/dm), and (3) high (over 50 N/dm) peel adhesion ranges. It is apparent that the degree of release can be selected to match the aggressiveness of the PSA with which it will be in contact and it is only for the most aggressive PSAs that a release value as high as 11N/dm would be selected. Release coatings for less aggressive PSAs would be selected to be correspondingly lower.

Typically the release coating composition does not require curing or crosslinking; however, if solvent resistance is desired for a particular application, crosslinking can be effected (e.g., after the copolymer (II) is blended with the coating composition (I)) by standard methods well-known in the art, such as radiation curing (e.g., electron beam or ultraviolet light) or chemical crosslinking.

Signage Article

In the present invention, a signage article is applied to a form sheet with a pressure sensitive adhesive provided on a rear surface of the signage article so that the form sheet with the signage article attached thereto can be treated as one-piece during a process including printing, and the signage article should be releasable from the form sheet so that the signage can be applied to the ultimate surface after the printing process.

A signage article usually has a substrate and a marking material in addition to a pressure sensitive adhesive. A signage article may include a substrate having an organic polymeric surface, a radiation cured coating disposed on the organic polymeric surface, and optionally a marking material disposed thereon (which form indicia such as numbers, letters, etc.). As described before, the marking material may have been disposed on the surface of the signage article before the signage article is applied to a form sheet, or/and the marking material may be provided on the surface of the signage article by printing after the signage article is applied to a form sheet.

Preferably, the marking material disposed on the surface of the signage article is not substantially removed upon wiping the marking material with gasoline for five times, more preferably ten times, further preferably 25 times.

In a preferred embodiment, the substrate of a signage article is retroreflective sheeting, which is preferably part of a validation sticker.

The signage article which has a surface allowing a marking material not substantially removed upon wiping the marking material with gasoline for five times and which has as a substrate a retroreflective sheeting, which is part of a validation sticker, is described in PCT Application No. PCT/US99/06918, whose disclosure is incorporated herein by reference.

An organic polymeric surface of a substrate of a signage article may be the direct surface of the substrate or a coating layer of another organic polymeric material (i.e., a receptive print layer) that enhances adhesion of the marking materials. Preferably, such material is a radiation cured material. Unexpectedly, radiation cured materials are receptive to a wide variety of marking materials using a wide variety of printing systems. Typically, the material is an oligomeric or polymeric material. It can be prepared from a precursor that is applied as a fluid capable of flowing sufficiently so as to be coatable, and then solidifying to form a film. Alternatively, it can be applied as a preformed film. The solidification can be achieved by curing (i.e., polymerizing and/or crosslinking) and/or by drying (e.g., driving off a liquid), or simply upon cooling. The precursor can be an organic solvent-borne, water-borne, or 100% solids (i.e., a substantially solvent-free) composition.

Figure 5:
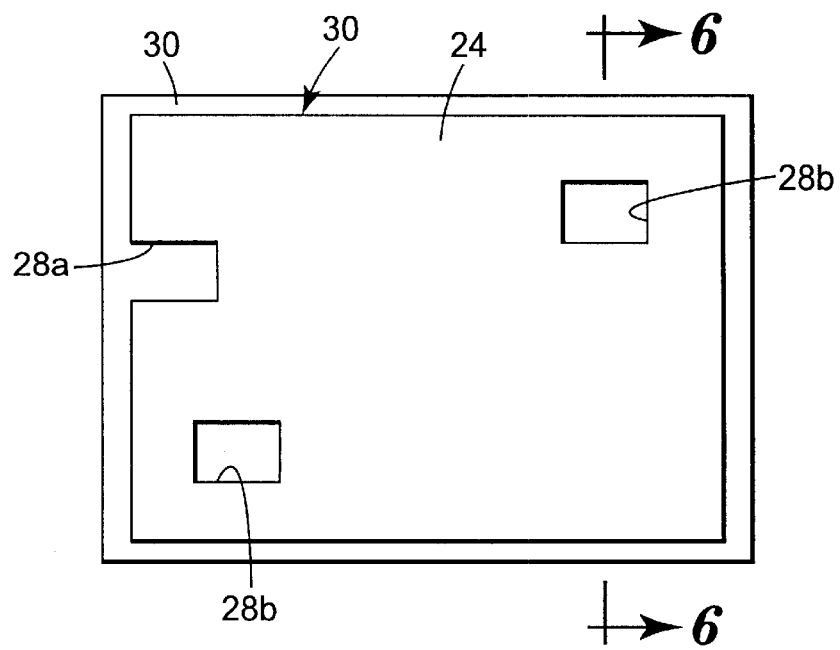
FIG. 5 is a plan view of a validation sticker.
Figure 6:
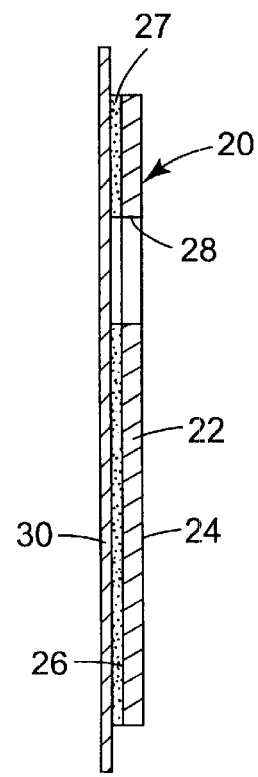
FIG. 6 is a cross-sectional view of the sticker of FIG. 5.

An illustrative validation sticker is shown in FIGS. 5 and 6. Validation sticker 20 comprises sheet 22 having first major surface 24 and second major surface 26. In the embodiment shown, second surface 26 has adhesive layer 27 disposed thereon. Sheet 22 may optionally have one or more security openings 28a, 28b, which provide tear and shredding sites for the stickers, thereby making them "frangible". In many instances, sticker 20 will be on a removable protective liner (i.e., a temporary carrier) 30 prior to use. Liner 30, to which sticker 20 is releasably bonded, can be used to facilitate fabrication and handling of the sticker. If desired, a carrier (not shown) releasably bonded to first major surface 24 may also be used alone or in combination with a carrier on second major surface 26.

First major surface 24 is adapted for presentation of readable information (i.e., indicia) resulting from the application of marking materials (e.g., toners or inks). In many embodiments, information will be readable to the unaided eye and may be in the form of selected alphanumeric characters or other symbols, e.g., bar codes, emblems, etc., in desired colors. If desired, the information may be readable by others means, e.g., machine readable infrared images. A variety of suitable means for forming desired images on major surface 24 will be readily apparent to those with ordinary skill in the art. To enhance the visibility and/or legibility of the sticker, surface 24 is preferably retroreflective, at least in part.

Typically, surface 24 comprises an organic noncellulosic polymeric surface to which marking material (not shown) can be directly applied. Preferably, the organic polymeric surface includes a radiation cured material, although other materials are also possible that provide an adhesion-enhancing surface. Alternatively, prior to the marking material being applied to sheet 22, the organic polymeric surface can be coated with a coating to form a distinct receptive print layer (not shown) with an adhesion-enhancing surface. Such a receptive print layer can be coated in a variety of thicknesses, such as about 0.1 mil to about 1.5 mils (about 2.5 micrometers to about 38 micrometers (microns)). As a receptive print layer, it can function at lower thicknesses, and as the thickness is increased the outdoor weatherability of the polymeric surface as well as the materials below (such as the retroreflective sheeting) could be improved. Significantly, the coating, which is preferably, a radiation cured coating, provides a very receptive surface for marking materials such that combinations of materials can be chosen that provide desirable properties. Suitable materials for making the receptive print layer are described below.

Second major surface 26 is adapted for bonding sticker 20 to a substrate (not shown). In some embodiments as shown in FIG. 6, surface 26 is coated with a layer of pressure-sensitive adhesive 27. Selection of suitable pressure-sensitive adhesives will be dependent in part upon the characteristics of the other portions of sticker 20, the characteristics of the substrate to which sticker 20 is to be applied, the conditions and manner under which the sticker is to be applied, and the conditions to which the substrate with applied sticker are to be subjected during use. Preferably, for a frangible signage article, such as a validation sticker, an adhesive is used that provides a peel strength to a substrate which exceeds the bond strength between the various layers of the articles. In this way, the article can be rendered frangible (for example, becomes fractured or distorted) when an attempt is made to remove the article from the substrate. A typical pressure sensitive adhesive (PSA) includes isooctylacrylate and acrylic acid.

Figure 7:
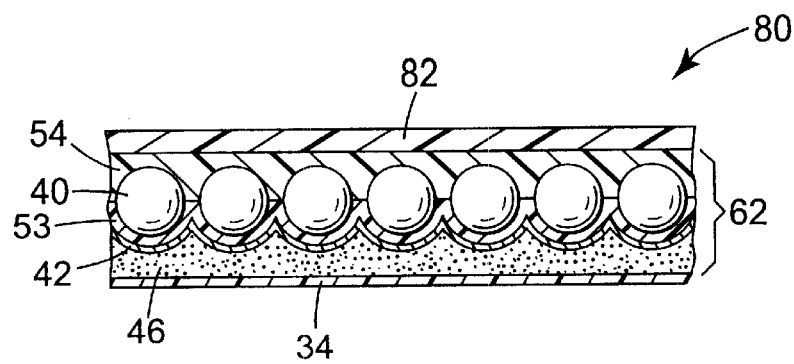
FIG. 7 is a cross-sectional view of a retroreflective signage article.

FIG. 7 illustrates a preferred embodiment of a retroreflective polymeric sheeting 80. Sheeting 80 includes a removable protective liner 34 at the bottommost side, a core sheet that includes a representative beaded retroreflective element 62 and a receptive print layer 82. Retroreflective element 62 includes pressure sensitive adhesive 46, a monolayer of microspheres 40 with underlying reflective material 42, space coat layer 53, and binder layer 54.

Sheeting 80 with receptive print layer 82 is directly receptive to marking materials that include a colorant and a binder (i.e., a resin-based colorant/binder). Furthermore, the receptive print layer 82 contributes to other functional properties of polymeric sheetings of the invention. In retroreflective sheeting material 80, layer 82 may serve as a cover layer/clear coat. Layer 82 may also complete optical relationships necessary to provide retroreflectivity.

The core sheet of sheeting 80 includes retroreflective element 62 and removable protective liner 34. However, a core sheet may include only element 62, for example, when sheeting 80 is adhered to a substrate. A liner such as liner 34 may optionally be a part of a core sheet in other embodiments disclosed herein as well.

Figure 8:
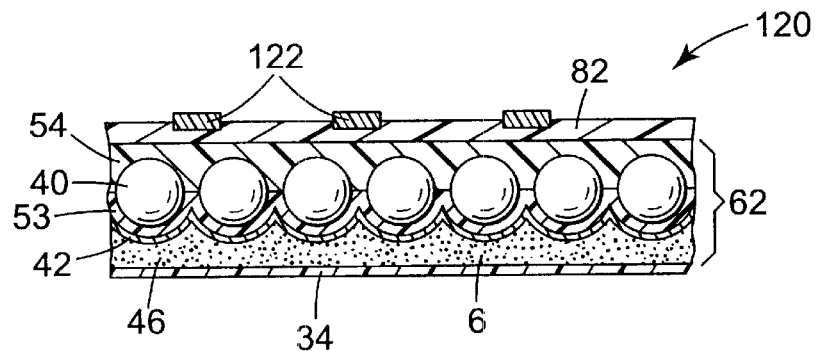
FIG. 8 is a cross-sectional view of a retroreflective signage article.
Figure 9:
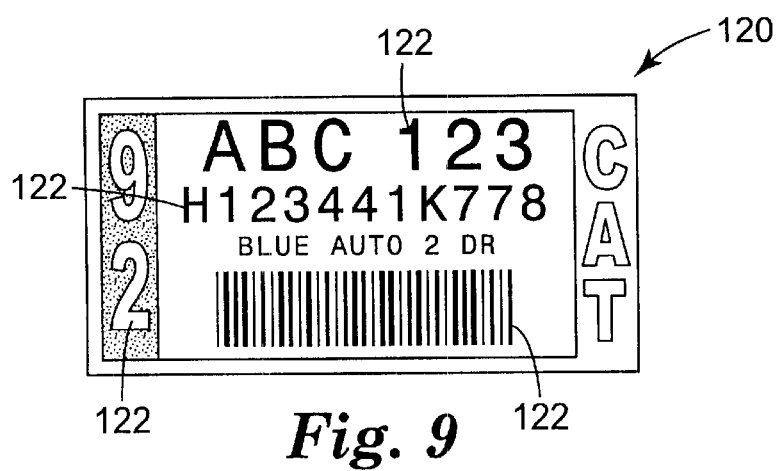
FIG. 9 shows an example of a validation sticker with indicia printed thereon.

An embodiment of a signage article having indicia thereon is shown schematically in cross-section in FIG. 8, and in a top view in FIG. 9. Signage article 120 includes indicia 122 and a core sheet that includes a retroreflective polymeric sheeting material 62 as described above. Indicia 122 may be formed from a resin-based colorant/binder, and receptive print layer 82 may be formed from, for example, a composition comprising a radiation curable resin. The receptive print layer may be pattern coated or form a continuous layer. It may also include a colorant if desired.

Retroreflective polymeric sheeting in the preferred signage articles of the present invention may be, for example, "beaded sheeting" in the form of an encapsulated-lens sheeting (see, for example, U.S. Pat. Nos. 3,190,178; 4,025,159; 4,896,943; 5,064,272; and 5,066,098), enclosed-lens sheeting (see, for example, U.S. Pat. No. 2,407,680), or may comprise a cube corner retroreflective sheeting (see, for example, U.S. Pat. Nos. 3,684,348; 4,801,193; 4,895,428; and 4,938,563).

For example, the core sheet may include a binder layer at the topmost side, a spacecoat layer that includes polyvinyl butyral, for example, under the binder layer, a monolayer of microspheres having bottommost and topmost surfaces, the bottommost surfaces embedded in the spacecoat layer and the topmost surfaces embedded in the binder layer, a reflective material underlying the monolayer of microspheres and a pressure sensitive adhesive layer at the bottommost side. The binder layer may include, for example, a polyvinyl butyral or a synthetic polyester resin crosslinked with a butylated melamine resin. The thickness of the binder layer typically is about 20 microns to about 120 microns thick. The microspheres typically are made of glass, have refractive indices of about 2.1 to about 2.3, and have diameters raging from about 30 microns to about 200 microns, preferably averaging about 60 microns in diameter. The microspheres generally are embedded about 50 percent in the binder layer. The spacecoat layer typically has a thickness extending from the surface of the microsphere of approximately one fourth the average diameter of the microspheres. The reflective material may be a layer of metal flakes or vapor or chemically deposited metal layer such as aluminum or silver.

Marking Material

Suitable marking materials are as those that are used by different printing processes to mark areas with a color, for example, other than the background (substrate color) such that the information printed can be discerned in some manner. Generally, such marking materials form indicia that is readable to the unaided eye and may be in the form of selected alphanumeric characters or other symbols, e.g., bar codes, emblems, etc., in desired colors. If desired, however, the information may be readable by other means, e.g., machine readable infrared images. Examples of such marking materials are those typically used in noncontact printers (e.g., toners used in laser printers) as well as impact printers (e.g., ink-containing ribbons used in thermal mass transfer).

Generally, each printing process requires different marking materials to produce printed images. Many of these are radiation curable, which have been developed to eliminate the environmental problems associated with sprayable and solvent-based materials.

Marking materials typically are formulated for the specific printing process with which they are to be used to produce printed images. In general, suitable marking materials for use in the present invention contain a colorant (e.g., pigments or dyes), resin vehicles (i.e., binders) in which the colorant is dissolved or dispersed, optional solvents or other fluids to control body, and other optional additives to induce drying and/or impart desired working properties.

For good adhesion to the adhesion-enhancing surface of the articles of the present invention, particularly the radiation cured materials, the binder of the marking materials optionally includes reactive components, i.e., materials capable of being crosslinked and/or polymerized by a wide variety of mechanisms (e.g., oxidative cure, condensation, moisture cure, radiation or thermal cure of free radical systems, etc.). More preferably, the binder of the marking material includes a polymer selected from the group of a polyester, a vinyl, a polyolefin, a polyvinyl acetal, an alkyl or aryl substituted acrylate or methacrylate, a copolymer of ethylene or propylene with acrylic acid, methacrylic acid or vinyl acetate, and combinations thereof. A variety of different marking materials applied from a variety of different printers are exemplified in Table 2 in the Examples section. Colorants and additives can vary for the different types of marking materials and printing systems, and are well known to those skilled in the art. Many suitable colorants and additives are listed above in the discussion of the chemistry of the adhesion-enhancing surface.

EXAMPLES AND TEST METHODS

Evaluation of the Performance

In evaluating the performance characteristics of compositions made in accordance with the invention, it has been found convenient to employ several tests, each of which will now be described in more detail.

Release Value

The test method used to evaluate the release coated flexible sheet materials of the Examples is a modification of the industry standard peel adhesion test used to evaluate PSA coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1(11/75).

Immediate Release Value

This test measures the effectiveness of the compositions as a release agent. The immediate release value is a quantitative measure of the force required to remove a flexible adhesive tape or sticker from a substrate coated with the test composition at a specific angle and rate of removal. In the following examples this force is expressed in grams per centimeter (g/cm).

A portion of each polymer solution prepared below in the Examples was diluted with an appropriate organic solvent and coated on 1 m long and 15.2 cm wide paper with a #6 Mayer rod (wire-wound rod). The coated paper sheets were dried at 65° C. for about minutes and were equilibrated in constant temperature room with 21° C. and 50% R.H. for about an hour.

Immediate release testing was conducted by laminating a 2.54 cm by 20.32 cm strip of the coated paper sheet coated-side up to the stage of an Instromentors, Inc. slip/peel tester (model 3M90) with double coated tape. A 1.9 cm wide and 20.3 cm long strips or 3.8 cm wide and 2.54 cm long stickers made from 3M Brand validation sheeting (without the liner) adhesive side facing the release coating was rolled down onto the laminate thus formed with a 1.82 kg rubber roller. The force required to remove this tape or sticker at 180° and 228.6 cm/minute was then measured.

Release Value after Printing

Release testing ("release after printing") was conducted in a similar manner to immediate release testing, with the exception of allowing the test tape or sticker to go through a laser printing process, prior to removal. The resulting article was printed with a laser printer such as one made by Minolta Corporation, Peripheral Products Division (PPD), Mahwah, N.J. Models Minolta Pageworks 8L or 18 were used following instructions supplied with the printer.

Adhesion and Re-adhesion Value

Adhesion values ("immediate adhesion") were measured by adhering the freshly peeled tape or sticker to a clean glass plate and measuring the peel adhesion in normal fashion using the same Instrumentors slip/peel tester indicated above, again peeling at 228.6 cm/min. and at a 1800 peel angle. Re-adhesion values ("adhesion after printing") were measured by adhering the peeled tape or sticker (after it had gone through the laser printing operation described above) to a clean glass plate and measuring the peel adhesion in normal fashion using the same Instrumentors slip/peel tester indicated above, again peeling at 228.6 cm/min. and at a 180° peel angle. These measurements were taken to determine whether a reduction in the adhesion value occurred due to undesirable contamination of the adhesive surface by the release coating.

Example 1

Preparation of ODA/MA/AN/AA Release Coating Material

An amber-colored quart bottle was charged with 102 g of octadecylacrylate (ODA) (50% solids in ethyl acetate), 11 g methyl acrylate (MA), 25 g acrylonitrile (AN), 13 g acrylic acid (AA) and 0.5 g azobisisobutyronitrile (AIBN) and 182 g ethyl acetate. The resulting mixture was purged with nitrogen for 3 minutes at 1 L/min after which the bottle was sealed. The sealed bottle containing the solution was tumbled in a constant temperature bath for 24 hr at 65° C. The resulting polymer solution (29.6% solids in ethyl acetate) was diluted to 5% solids with toluene.

Example 2

Preparation of MA/MMA/MAA/KF-2001 Release Coating Material

The procedure of Example 1 was repeated. The charges of the components were as follows:

50 g MA, 20 g methyl methacrylate (MMA), 5 g methacrylic acid (MAA), 25 g mercaptofunctional silicone (KF-2001, available from Shinitsu), 0.25 g AIBN and 150 g methyl ethyl ketone (MEK) solvent.

The sealed bottle containing the solution was tumbled in a constant temperature bath at 65° C. for 48 hr. The resulting polymer solution (40% solids in MEK) was diluted to 5% solids with toluene.

Example 3

Preparation of 80/20 blend of Example 1 and Example 2 solutions

A one-gallon wide mouth jar was charged with 2368 g solution of Example 1 (5% solids in ethyl acetate and toluene) and 592 g solution of Example 2 (5% solids in MEK/toluene). The resulting mixture was placed on a table top shaker for about 15 minutes to obtain 80/20 blend at 5% solids.

Example 4

Preparation of 70/30 blend of Example 1 and 2 solutions

A one-gallon wide mouth jar was charged with 2072 g solution of Example 1 and 888 g solution of Example 2. The resulting mixture was placed on a table top shaker for about 15 minutes to obtain 70/30 blend at 5% solids.

Example 5

Preparation of premium release silicone

In a 1-liter open mouthed jar were charged 200 g polydimethyl silanol solution (in heptane), ss-4191 A (available from GE silicone), 0.92 g tin catalyst solution , ss-4192 C (available from GE silicone), 0.54 g dimethyl amino propyl silane, SS-4259 C (available from GE silicone) and 0.044 g calcofluor white fluoroescent dye (trade Name-Blankophor Sol, available from Bayer). The resulting mixture was adjusted to 5% solids in toluene before coating on a substrate.

Example 6

Preparation of 50/50 blend of Example 1 and Example 5

In a 500 ml wide mouthed jar were charged 60 g Example 1 solution (5% solids in a mixture of ethyl acetate/toluene) and 60 g Example 5 solution (5% solids). The resulting mixture was placed on a table top shaker for about 30 minutes before it was coated on a substrate.

Example 7

Preparation of 75/25 blend of Example 2 and Example 5

In a 500 ml wide mouth jar were charged 45 g Example 2 solution (5% solids in MEK/toluene) and 15 g Example 5 solution (5% solids). The resulting mixture was placed on a table top shaker for about 30 minutes before it was coated on a substrate.

RESULTS

Table 1 below describes immediate release, immediate adhesion, release after printing, adhesion after printing and toner receptivity of articles of the present invention. Toner receptivity (Tape/Print test) was qualitatively measured by assigning the numbers (1 to 10, 10 being the best).

By adjusting the compositions of the coatings (e.g., the ratios of Example #1 and #2), release and toner receptivity can be adjusted as desired.

TABLE 1

| Example | Immediate Release | Immediate Adhesion | Release after printing | Adhesion after printing | Tape/Print Test |
|---|---|---|---|---|---|
| #1 | 60 | Tore | 288 | Tore | 8 |
| #2 | 21 | 430 | 33 | 300 | 10 |
| #3 | 27 | Tore | 120 | Tore | 4 |
| #4 | 30 | Tore | 137 | Tore | 4 |
| #5 | 80 | Tore | 112 | Tore | 1 |
| #6 | 80 | 445 | 142 | Tore | 4 |
| #7 | 18 | Tore | 32 | Tore | 7 |

Comments for Table:
Release/adhesion units are grams/cm. Toner receptivity (Tape/Print test) is reported using a 1–10 scale with 10 being best Adhesion was measured on a glass substrate Results where the samples "Tore" indicate very high adhesion to the glass substrate The choice of printer used in this testing is for illustration purposes only. It is also within the scope of the present invention to use other printing processes (e.g., ink jet and/or thermal printers) if desired.

All sheets fabricated this way (paper form with signage) traveled through the printer without any jamming or other media transport problems.

The complete disclosures of all patents, patent documents, and publications are incorporated herein by reference as if individually incorporated. It will be appreciated by those skilled in the art that various modifications can be made to the above described embodiments of the invention without departing from the essential nature thereof. The invention is intended to encompass all such modifications within the scope of the appended claims.

What is claimed is:

1. A filling-in form construction, comprising: a substrate having a digital printable surface portion and a release coating surface portion, on which release coating surface portion a signage with a pressure sensitive adhesive can be releasably adhered; and digital printed information on at least the digital printable surface portion.

2. The filling-in form construction according to claim 1, wherein the digital printable surface portion and the release coating surface portion do not overlap with each other.

3. The filling-in form construction according to claim 1, wherein the digital printable filling-in surface portion and the release coating surface portion overlap with each other at least in a portion thereof.

4. The filling-in form construction according to claim 1, wherein the release coating surface portion has a heat and humidity stable release coating.

5. The filling-in form construction according to claim 4, wherein the release coating surface portion has an adhesion loss of less than 10% after a heat treatment in printing.

6. The filling-in form construction according to claim 1, wherein the information is printed by at least one of laser, ink-jet, thermal mass transfer, thermal dye transfer, electrostatic, ion deposition, electron beam imaging, solid ink-jet and dot-matrix printings.

7. The filling-in form construction according to claim 1, wherein the information is laser printed.

8. A filling-in form construction according to claim 1, wherein the substrate is in the form of a roll.

9. The filling-in form construction according to claim 8, wherein the roll comprises individual portions separated by perforation lines.

10. The filling-in form construction according to claim 1, wherein the substrate is a form sheet.

11. The filling-in form construction according to claim 1, wherein the signage article comprises a retroreflective sheeting.

12. The filling-in form construction according to claim 11, wherein the signage article is a part of a validation sticker and the substrate is a form sheet.

13. The filling-in form construction according to claim 1, wherein a surface, opposite to the adhesive, of the signage article is receptive to a marking material wherein the marking material when received thereon is not substantially removed from the signage article upon wiping the marking material with gasoline for five times.

14. The filling-in form construction according to claim 1, wherein the release coating surface portion includes: a copolymerization product (I) of
   (a) 25 to 70% by weight of at least one ester of acrylic acid or methacrylic acid with a long chain alkyl terminated primary alcohol wherein the terminal alkyl chain is from 12 to 22 carbon atoms in length;
   (b) 4 to 15% by weight of at least one carboxylic acid functional monomer; and
   (c) 15 to 60% by weight of at least one free radically polymerizable monomer.

15. The digital printable release coating composition according to claim 14, wherein the free radically polymerizable monomer is selected from the group consisting of methyl acrylate, methyl methacrylate, isobutyl methacrylate, acrylonitrile, methacrylonitrile, ethyl acrylate, isbornyl (meth)acrylate, N-Vinyl pyrollidone, and N-Vinyl caprolactam.

16. The digital printable release coating composition according to claim 14, wherein the copolymerization product (I) is blended with at least one silicone/acrylate copolymer (II).

17. The digital printable release coating according to claim 14, wherein the copolymerization product (I) is blended with at least one silicone/acrylate copolymer (II) in a ratio of the blend of (I)/(II) is in a range of not more than 80/20.

18. The digital printable release coating composition according to claim 17, wherein the silicone/acrylate copolymer (II) has at least one hydrocarbon polymeric segment having a $T_g$ between −10° C. and 65° C. present at a weight percent great enough to provide the copolymer with the capability of substantially anchoring marking material and at least one siloxane polymeric segment having a number average molecular weight above about 100 present at a weight percent great enough to provide the copolymer with a surface release value not greater than about 11 Newtons/dm.

19. The digital printable release coating composition according to claim 18, wherein the silicone/acrylate copolymer (II) is a copolymer having the formula:

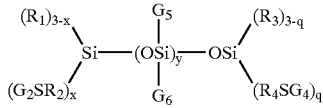

wherein, $R_1$ are monovalent moieties which can independently be the same or different and are selected from the group consisting of alkyl, aryl, alkaryl, alkoxy, alkylamino, hydroxyl, hydrogen, and fluoroalkyl;

$R_2$ can independently be the same or different and are divalent linking groups;

$R_3$ are monovalent moieties which can independently be the same or different and are selected from the group consisting of alkyl, aryl, alkaryl, alkoxy, alkylamino, hydroxyl, hydrogen, and fluoroalkyl;

$R_4$ can independently be the same or different and are divalent linking groups;

x is an integer of 0 to 3;

y is an integer of 10 or greater;

q is an integer of 0 to 3; and $G_5$ and G6 are monovalent moieties which can independently be the same or different selected from the group consisting of alkyl, aryl, alkaryl, alkoxy, alkylamino, fluoralkyl, hydrogen, and —WSA;

A is a hydrocarbon polymeric segment or block consisting essentially of polymerized free radically polymerizable monomer;

W is a divalent linking group; and $G_2$ and $G_4$ comprise A.

20. The digital printable release coating composition according to claim 16, wherein the silicone/acrylate copolymer (II) is a copolymer of D and E monomers copolymerized to form a polymeric backbone with F monomer grafted thereto wherein D is at least one free radically polymerizable vinyl monomer;

E is at least one polar monomer copolymerizable with D, the amount of E being up to 30% of the total weight of all monomers, and F is a monomer having the general formula:

wherein

X is a group copolymerizable with the D and E monomers,

Y is a divalent linking group where n is zero or 1;

m is an integer of from 1 to 3;

R is hydrogen, lower alkyl, aryl, or alkoxy; and

Z is a monovalent siloxane polymeric moiety having a number average molecular weight above about 1,000 and is essentially unreactive under copolymerization conditions.

21. The digital printable release coating composition according to claim 20, wherein the D monomer is selected from the group consisting of styrene, vinyl acetate, vinyl chloride, vinylidene chloride, acrylonitrile, acrylic or methacrylic acid esters of non-tertiary alcohols having from 1 to about 18 carbon atoms and mixtures thereof.

22. The digital printable release coating composition according to claim 20, wherein the E monomer is selected from the group consisting of acrylic acid, methacrylic acid, itaconic acid, acrylamide, methacrylamide, N,N-dimethylacrylamide, methacrylonitrile and maleic anhydride.

23. The filling-in form construction according to claim 14, wherein the copolymerization product (I) is blended with at least one silicone containing agent (III).

* * * * *

UNITED STATES PATENT AND TRADEMARK OFFICE
CERTIFICATE OF CORRECTION

PATENT NO. : 6,482,510 B1
DATED : November 19, 2002
INVENTOR(S) : J. Sundar Rajan et al.

It is certified that error appears in the above-identified patent and that said Letters Patent is hereby corrected as shown below:

Title Page
Item [56], References Cited, U.S. PATENT DOCUMENTS, "5,462,468" should read -- 5,462,768 --.

Column 1,
Line 19, insert -- . -- after ")".

Column 2,
Line 52, "fluoralkyl" should read -- fluoroalkyl --.

Column 3,
Line 37, "5%" should read -- Sol, --.

Column 4,
Line 4, "PREFERREED" should read -- PREFERRED --.

Column 5,
Line 62, "has" should read -- as --.
Line 65, "substrates" should read -- substrate 15 --.

Column 6,
Line 23, "Principles of Non Impact Printing" should be italicized,
-- *Principles of Non Impact Printing* --.
Line 56, "receving" should read -- receiving --.

Column 7,
Line 12, "doner" should read -- donor --.
Line 63, delete "of".

Column 8,
Line 16, "viny-lacetate" should read -- vinyl-acetate --.
Line 58, add a comma -- , -- after "i.e.".

Column 9,
Line 64, insert a colon -- : -- between "composition" and "blend".

Column 10,
Line 63, "fluoralkyl" should read -- fluoroalkyl --.

Column 11,
Line 56, move "wherein" to below the formula.

UNITED STATES PATENT AND TRADEMARK OFFICE
CERTIFICATE OF CORRECTION

PATENT NO. : 6,482,510 B1
DATED : November 19, 2002
INVENTOR(S) : J. Sundar Rajan et al.

It is certified that error appears in the above-identified patent and that said Letters Patent is hereby corrected as shown below:

Column 12,
Line 61, in the formula "zm" should read -- $Zm$ --.

Column 13,
Line 59, insert a colon -- : -- between "composition" and "blend".

Column 14,
Line 53, insert a colon -- : -- between "composition" and "blend".

Column 16,
Line 39, "others" should read -- ranging --.

Column 18,
Line 5, "raging" should read -- ranging --.

Column 19,
Line 24, insert -- 15 -- between "about" and "minutes".
Line 52, "1800" should be -- 180° --.

Column 20,
Lines 36-38, insert periods, -- . -- after "substrate" and "Substrate", in each instance.
Line 51, delete the space between "solution" and ",".

Column 22,
Line 55, insert -- composition -- between "coating" and "according".
Line 67, "present" should read -- percent --.

Column 23,
Line 30, "G6" should read -- $G_6$ --.
Line 33, "fluoralkyl" should read -- fluoroalkyl --.

UNITED STATES PATENT AND TRADEMARK OFFICE
CERTIFICATE OF CORRECTION

PATENT NO. : 6,482,510 B1
DATED : November 19, 2002
INVENTOR(S) : J. Sundar Rajan et al.

It is certified that error appears in the above-identified patent and that said Letters Patent is hereby corrected as shown below:

Column 24,
Line 12, "zm" should read -- Zm --.

Signed and Sealed this

Twenty-first Day of October, 2003

JAMES E. ROGAN
*Director of the United States Patent and Trademark Office*

(12) EX PARTE REEXAMINATION CERTIFICATE (5883rd)
United States Patent
Rajan et al.

(10) Number: US 6,482,510 C1
(45) Certificate Issued: Sep. 4, 2007

(54) DIGITAL PRINTABLE AND RELEASABLE FORM CONSTRUCTION AND COMPOSITION USEFUL THERETO

(75) Inventors: J. Sundar Rajan, Woodbury, MN (US); Roberta E. Harelstad, Woodbury, MN (US); Joey L. Reule, Cottage Grove, MN (US); Ramesh C. Kumar, Maplewood, MN (US)

(73) Assignee: 3M Innovative Properties Company, St. Paul, MN (US)

Reexamination Request:
No. 90/006,780, Sep. 22, 2003

Reexamination Certificate for:
Patent No.: 6,482,510
Issued: Nov. 19, 2002
Appl. No.: 09/635,608
Filed: Aug. 10, 2000

Certificate of Correction issued Oct. 21, 2003.

Related U.S. Application Data

(63) Continuation-in-part of application No. 09/379,534, filed on Aug. 24, 1999, now Pat. No. 6,406,787, which is a continuation-in-part of application No. PCT/US99/06918, filed on Mar. 30, 1999.

(51) Int. Cl.
*B32B 7/04* (2006.01)
*B32B 7/10* (2006.01)

(52) U.S. Cl. .......................... 428/349; 428/343; 428/428; 428/425.5; 428/446; 428/447; 525/418; 525/451

(58) Field of Classification Search ....................... None
See application file for complete search history.

(56) References Cited

U.S. PATENT DOCUMENTS

| 5,670,096 A | 9/1997 | Lu |
| 6,027,014 A * | 2/2000 | Cochran ...................... 229/70 |
| 6,092,843 A | 7/2000 | Peterson et al. |

FOREIGN PATENT DOCUMENTS

WO     WO 99/11683     * 3/1999

\* cited by examiner

*Primary Examiner*—Kiley Stoner

(57) ABSTRACT

A novel form construction comprising a substrate (e.g., a form sheet or roll goods) having a digital printable surface portion and a release surface portion, on which release coating surface portion a signage with a pressure-sensitive adhesive can be releasably adhered. A digital printable release coating composition is also provided.

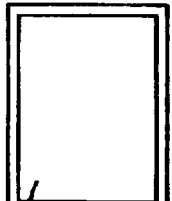

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 11 is cancelled.

Claims 1 and 12–14 are determined to be patentable as amended.

Claims 2–10 and 15–23, dependent on an amended claim, are determined to be patentable.

New claims 24–25 are added and determined to be patentable.

1. A filling-in form construction, comprising: a substrate having a digital printable surface portion and a release coating surface portion *disposed on the substrate*, on which release coating surface portion [a signage] *retroreflective sheeting* with a pressure sensitive adhesive [can be] *is* releasably adhered; and digital printed information on at least the digital printable surface portion.

12. The filling-in form construction according to claim [11] *1*, wherein the [signage article] *retroreflective sheeting* is part of a validation sticker and the substrate is a form sheet.

13. The filling-in form construction according to claim 1, wherein a surface, opposite to the adhesive, of the [signage article] *retroreflective sheeting* is receptive to a marking material wherein the marking material when received thereon is not substantially removed from the [signage article] *retroreflective sheeting* upon wiping the marking material with gasoline for five times.

14. The filling-in form construction according to claim [1] *24*, wherein the release coating surface portion includes: a copolymerization product (I) of
   (a) 25 to 70% by weight of at least one ester of acrylic acid or methacrylic acid with a long chain alkyl terminated primay alcohol wherein the terminal alkyl chain is from 12 to 22 carbon atoms in length;
   (b) 4 to 15% by weight of at least one carboxylic acid functional monomer; and
   (c) 15 to 60% by weight of at least one free radically polymerizable monomer.

*24. A filling-in form construction, comprising: a substrate having a digital printable surface portion and a digital printable release coating surface portion, on which release coating surface portion retroreflective sheeting with a pressure sensitive adhesive is releasably adhered, and digital printed information on the digital printable surface portion and on the digital printable release coating.*

*25. The filling-in form construction of claim 24 wherein the digital printable release coating is disposed on the substrate.*

* * * * *